United States Patent [19]

Hudson

[11] 4,437,104

[45] Mar. 13, 1984

[54] INK DISPOSAL SYSTEM FOR INK JET PRINTER

[75] Inventor: David M. Hudson, Chelmsford, Mass.

[73] Assignee: Advanced Color Technology, Inc., Chelmsford, Mass.

[21] Appl. No.: 376,780

[22] Filed: May 10, 1982

[51] Int. Cl.[3] .......... G01D 15/18

[52] U.S. Cl. .......... 346/140 R

[58] Field of Search .......... 346/75, 140, 1.1

[56] References Cited

U.S. PATENT DOCUMENTS

| | | | |
|---|---|---|---|
| 3,945,022 | 3/1976 | Distler | 346/75 |
| 4,121,222 | 10/1978 | Diebold et al. | 346/140 IJ X |
| 4,148,041 | 4/1979 | Rosenstock | 346/140 PD |
| 4,320,406 | 3/1982 | Heinzl | 346/1.1 X |

*Primary Examiner*—Donald A. Griffin

*Attorney, Agent, or Firm*—E. Thorpe Barrett

[57] ABSTRACT

The invention is embodied in a pressurized ink supply system for a three color ink jet printer. In order to provide a relatively large ink supply, three stationary primary ink reservoirs, formed as three log tubular sacks of flexible plastic film, contained in a pressurized disposable cartridge, are connected through flexible plastic umbilical tubes, and three solenoid-operated valves, to three secondary ink reservoirs mounted on the movable carriage of the print head.

The pressure in the primary reservoirs, under automatic control, forces the ink to the secondary reservoirs and, under manual control, purges the ink passages and orifices by momentarily opening all of the solenoid valves. The waste ink that is discharged by this purging operation is captured and returned to a separate waste-ink storage chamber in the disposable cartridge. This waste-ink storage chamber is maintained under a slight vacuum by the same pump that provides the pressure for the ink reservoirs.

1 Claim, 14 Drawing Figures

INK DISPOSAL SYSTEM FOR INK JET PRINTER

FIELD OF THE INVENTION

This invention relates to ink jet printers of the type in which ink is ejected in droplets from a moving head to form a desired pattern. More particularly this invention relates to an improved ink disposal system for storing and disposing of waste ink caused by purging or other incidents of operation.

DESCRIPTION OF THE PRIOR ART

Various purging systems are known in the prior art. U.S. Pat. No. 4,123,761 to Kimura et al. shows a single-color system in which a reserve ink supply is maintained under pressure and when a purge valve is opened the ink is forced through the passages to remove any bubbles and impurities. A suction system is operated during the purging operation to remove waste ink and return it to a chamber surrounding the ink supply reservoir. U.S. Pat. No. 4,038,667 to Hou et al. shows a somewhat similar purging system in which a separate ink reservoir is maintained under pressure for the sole purpose of purging the ink channels. U.S. Pat. No. 4,148,041 to Rosenstock describes a system in which an isoparaffin solvent, immiscible with the ink, is used for flushing rather than the ink supply itself. The excess flushing liquid returns by gravity flow to a wick-filled chamber adjacent the ink reservoir.

SUMMARY OF THE INVENTION

The invention is embodied in a pressurized ink supply system for a three color ink jet printer. In order to provide a relatively large ink supply, three stationary primary ink reservoirs are connected by flexible plastic umbilical tubes to three secondary ink reservoirs mounted on the carriage that move with the print head across the sheet being printed. The three primary reservoirs comprise relatively long tubular sacks of flexible plastic housed in a closed disposable cartridge that is kept under continuous pressure.

The pressure in the primary reservoirs is utilized for carrying the ink to the secondary reservoirs under automatic control and, under manual control, for purging the ink passages by momentarily opening the passageways between the primary reservoirs and the secondary reservoirs for a period sufficient to allow the pressure in the secondary reservoirs to equal the pressure in the primary reservoirs and force the ink through the orifices. The waste ink that is discharged by this purging operation is captured and returned to a separate compartment in the disposable cartridge that houses the three primary ink reservoirs. This waste receiving chamber is maintained under a slight vacuum by the same pump that provides the pressure for the ink reservoirs. This arrangement provides greater waste ink storage capacity than would be feasible with a disposal compartment mounted on the moving carriage and provides for automatic disposal each time the disposal ink cartridge is replaced.

DESCRIPTION OF THE PREFERRED EMBODIMENT

Figure 1:
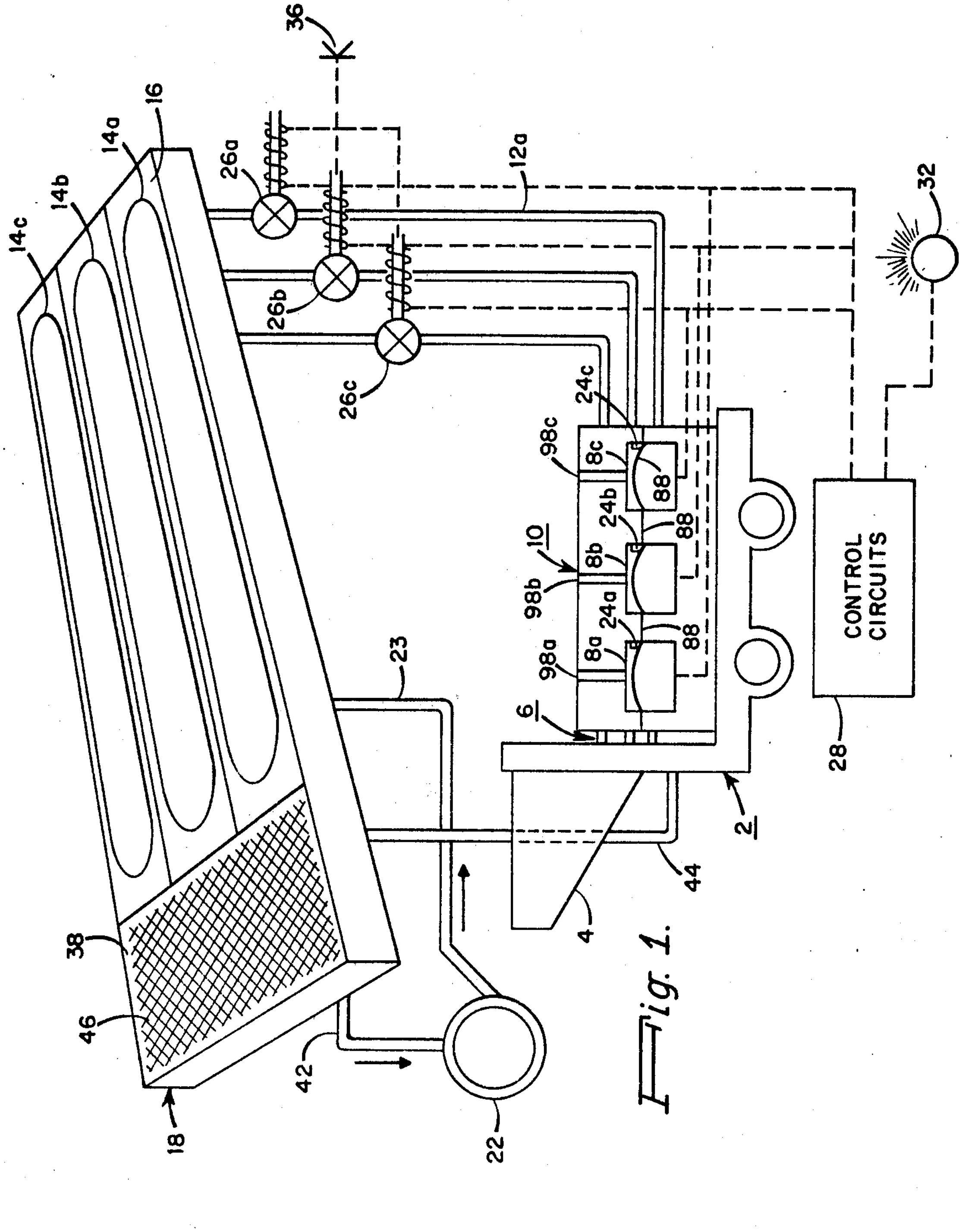
FIG. 1 is a diagrammatic illustration showing the principal components of the inking system embodying the invention.

As shown in FIG. 1, a movable carriage assembly, generally indicated at 2, supports a printing head 4 having multiple ink jet orifices (not shown) that are connected by ink supply tubes, indicated diagrammatically at 6, to three secondary ink reservoirs **8*a*, 8*b*, and 8*c* for the three colors of ink. The secondary ink reservoir 8*a* is connected by a flexible plastic umbilical tube 12*a* to a supply reservoir comprising a flexible ink sack 14*a* positioned in a compartment 16 of a rigid plastic housing 18 that forms a replacebale ink cartridge. The compartment 16 is maintained under constant pressure, for example between 3 and 7 pounds per square inch, by an air pump 22. The pump is conventional and of a type readily available commercially. The compartment 16 also contains two additional containers 14*b* and 14*c*** for the other colors of ink.

In operation, the ink from each of the three secondary reservoirs is fed to the orifices under impulses generated by piezoelectric means in the usual manner that is well known in the art. The secondary reservoirs are small in size so that minimum mass is required to be carried by the moving carriage assembly 2. It is important that the level of ink in the secondary reservoirs be maintained within relatively close limits so that the hydrostatic pressure at the orifices is within practical operating limits, for example, between 1 and 3 centimeters below atmospheric, with no substantial disparity between the three colors of ink.

The small size of the secondary reservoirs **8*a*, 8*b* and 8*c* require they be replenished often from the respective primary reservoirs 14*a*, 14*b* and 14*c*. A sensor unit, generally indicated at 24*a*, 24*b* and 24*c*, is incorporated in each of the secondary reservoirs and when the ink in any secondary reservoir drops below a predetermined level, an appropriate solenoid-operated valve of those indicated generally at 26*a*, 26*b* and 26*c*** is opened and allows ink to flow through the valve into the secondary reservoir until the level sensor indicates the reservoir has been filled to the desired height.

Actuation of the solenoid valve **26*a* also starts a timer circuit in a central processor unit, indicated diagrammatically at 28. If the sensor 24*a* fails to indicate within some predetermined period of time that the reservoir 8*a*** has been filled, a signal light 32 is lit to indicate to the operator that the ink in the primary sack 14*a* is low and the disposable ink cartridge 18 is to be replaced. This filling operation occurs only at the end of a line, when the printing head is inactive, and requires only a fraction of a second to transfer the required amount of ink. The control circuits 28 include software that prevents activation of the solenoid valves 26*a*, 26*b* and 26*c* when the printing head is moving.

To purge the system and remove any air bubbles or contaminating particles, a manual switch 36 is provided that simultaneously energizes each of the solenoid valves 26*a*, 26*b* and 26*c* and permits the flow of ink into the three secondary reservoirs 8*a*, 8*b*, and 8*c* so that these reservoirs assume the same pressure as the primary chamber 16 forcing ink from the secondary reservoirs and flushing the ink passages and the orifices.

This flushing operation results in waste ink that must be collected and disposed of. Dimensional constraints in the carriage assembly that must carry a number of ink reservoirs, makes it impractical to collect the waste ink in the carriage assembly. Moreover, it is advantageous to dispose of the waste ink automatically each time the ink cartridge 18 is replaced. To this end, a separate sealed chamber 38 is provided in the cartridge 18 and is connected by a flexible tube 42 to the input side of the air pump 22. Another such tube 44 connects the chamber 38 to a conventional collection trough (not shown) that receives the waste ink from the printing head 4. The pump 22 maintains a slight suction in the chamber 38 so that waste ink is sucked into the chamber 38. A wick 46 of absorbent material may be placed in the chamber 38 to absorb the waste ink. The waste ink is thus disposed of each time the cartridge 18 is replaced.

In FIG. 1, the electrical connections are illustrated diagrammatically by broken lines. Details of the electrical circuits are not shown here since the necessary circuitry will be apparent to those skilled in the art.

Figure 2:
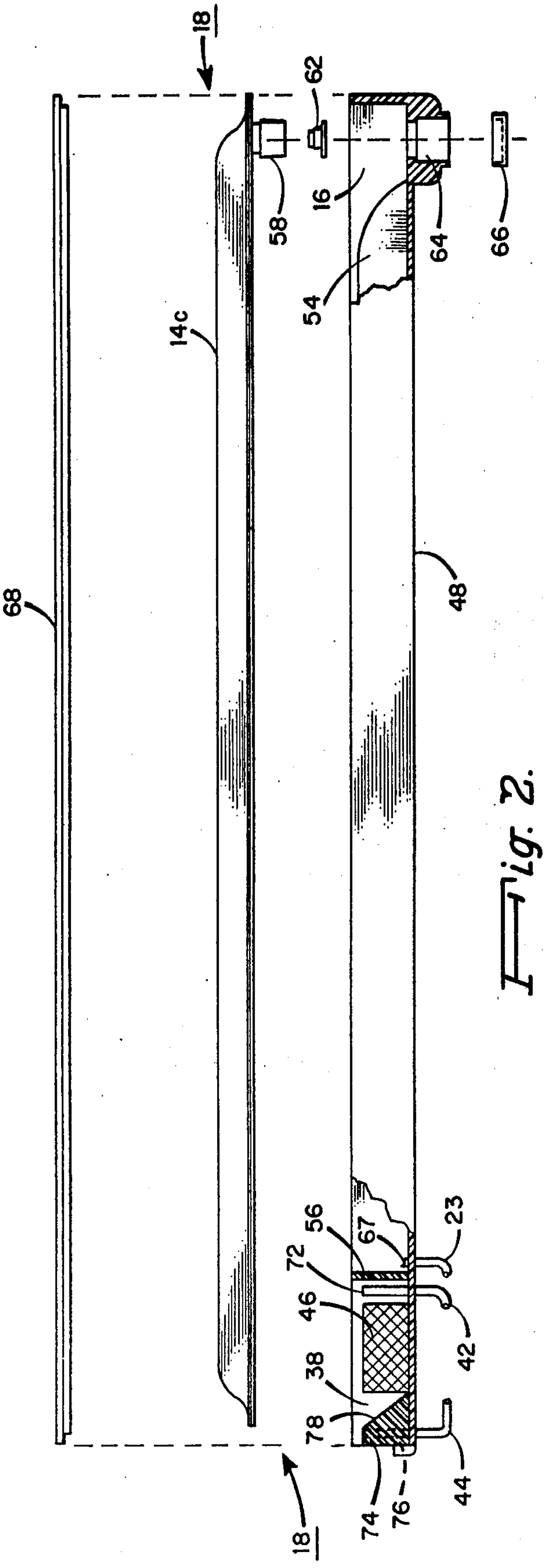
FIG. 2 is a side view of the primary reservoir showing the principal components prior to assembly.
Figure 3:
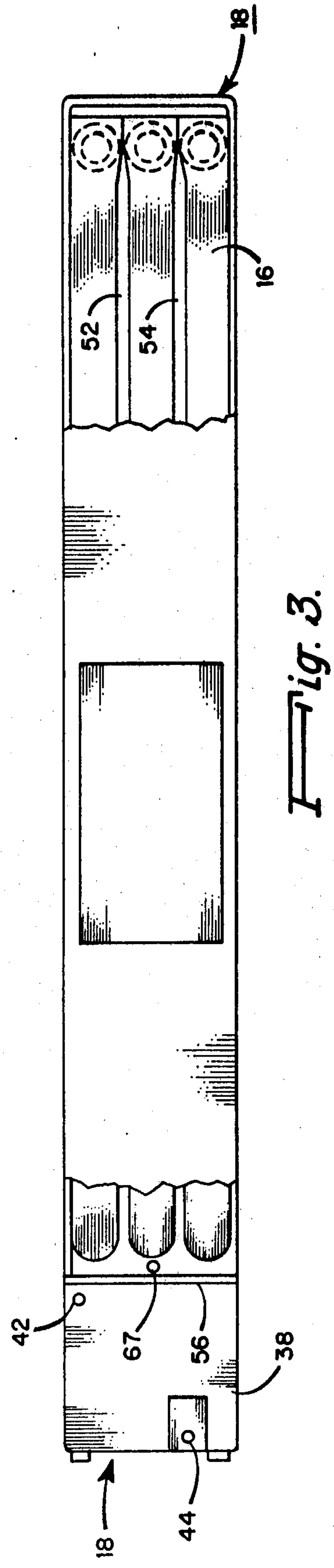
FIG. 3 is a top view of the primary ink reservoir with portions of the cover cut away.

The construction of the ink cartridge is shown in more detail in FIGS. 2 and 3. A bottom tray 48 has two dividers 52 and 54, terminated at one end by a partition 56, that form three longitudinal compartments within the chamber 16.

The construction of the ink sack 14*c* shown in FIG. 2 is typical of each of the three sacks. The sack may be formed of two strips of thin flexible plastic heat sealed along the edges. The sack 14*c* may, for example, be approximately 15 inches in length and of such cross section as to provide a capacity for about 100 cubic centimeters of ink. Near one end of the sack, a rigid plastic collar 58 is sealed to the outer surface of one wall of the sack. A soft rubber plug 62 is press-fitted into the collar 58 and forms an ink-tight seal. The ink sack is filled, for example, with ink at the opposite end from the collar 58 before that end of the sack is sealed. The sack filled with ink is then placed in one of the longitudinal cavities of the chamber 16 with the collar 58 extending into a well 64 formed on the underside of the tray 48. The well 64 is sealed at its lower end by a plastic cap 66. To permit pressurizing the compartment 16, an opening 67 is provided in the floor of the tray 48. This opening is sealed until the time of installation.

After the three primary ink reservoir sacks 14*a*, 14*b* and 14*c* have been placed in the tray 48, a flanged cover 68 is secured to the top of the tray and sealed tightly around its periphery and along the top edge of the partition 56 so that the chamber 16 is completely sealed from the outside air and from the waste ink in the chamber 38. The cartridge 18 may thus be shipped and handled without danger of ink spillage even if one of the ink sacks should be ruptured.

The chamber 38, which is also completely sealed by the cover 68, contains a standpipe 72 that is connected through an opening in the bottom of the tray to the suction tubing 42. A plastic abutment 74, formed integrally with the tray 48, has a vertical bore 76 that is arranged for connection, by any suitable means, to the waste ink tube 44. The waste ink enters the compartment 38 through the bore 76 and runs down a sloping face 78 to be absorbed by the wick 46 which may substantially fill the chamber 38.

Figure 4:
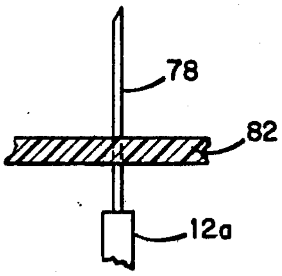
FIG. 4 shows one of the hollow sharpened needles by which connection is made to the disposable primary ink cartridge.

When the ink carriage 18 is to be installed in the printer, it is placed on a receiving structure (not shown) and forced downwardly into position. To provide a convenient ink connection to the sacks 14*a*, 14*b* and 14*c*, three hollow sharpened needles, only one of which is shown at 78 in FIG. 4, are mounted in a base 82 that forms a rigid part of the receiving structure. The lower end of each hollow needle 78 is connected to the appropriate ink supply tube 12*a*, 12*b* or 12*c*. When the cartridge 18 is pushed down onto the needles 78, the sharpened end of each needle penetrates, in succession, the cap 66, the rubber plug 62 and the wall of the corresponding ink sack 14*a*, 14*b*, or 14*c*. Connections are then made, by any suitable means (not shown), to the flexible tubes 23, 42 and 44. The cartridge is now completely connected and provides a source of a substantial quantity of each of the three colors of ink.

Figure 5:
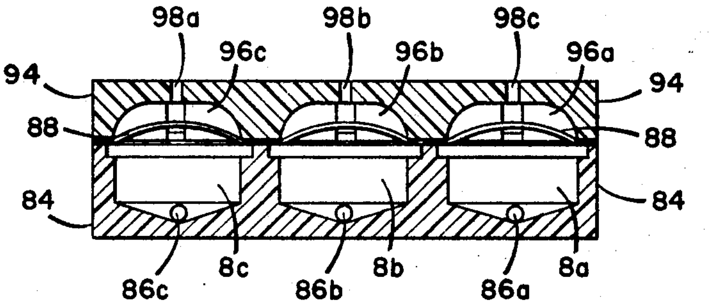
FIG. 5 is an enlarged vertical sectional view of the secondary ink reservoir.
Figure 6:
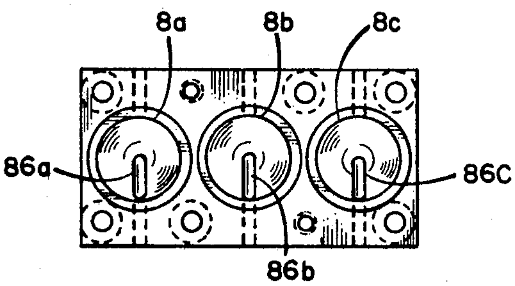
FIG. 6 is a top view of the lower part of the secondary ink reservoir.
Figure 7:
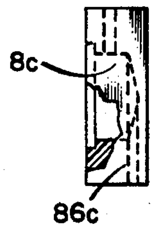
FIG. 7 is an end view of the reservoir shown in FIG. 6.
Figure 8:
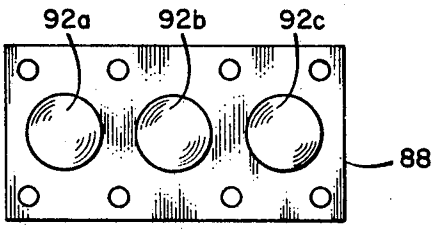
FIG. 8 is a top view of the flexible diaphragm of the secondary ink reservoir.
Figure 9:
FIG. 9 is a side view of the diaphragm shown in FIG. 8.
Figure 10:
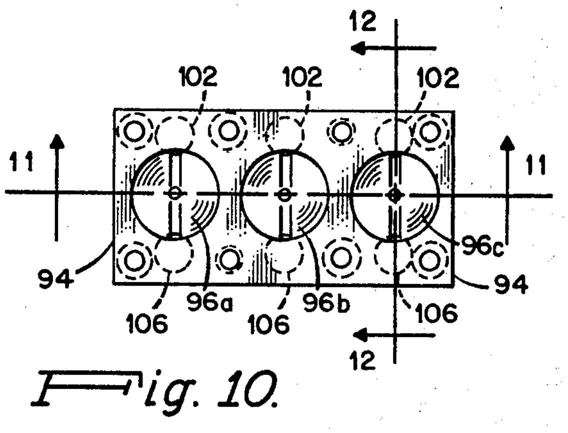
FIG. 10 is a bottom view of the cap of the secondary ink reservoir.
Figure 12:
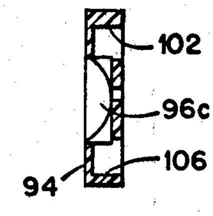
FIG. 12 is a section along line 12—12 of FIG. 10.
Figure 11:
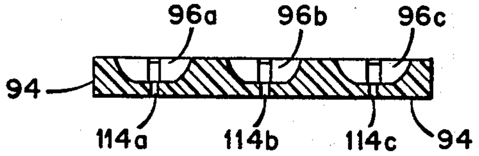
FIG. 11 is a section along line 11—11 of FIG. 10.

FIGS. 5–14 show details of the secondary reservoir cartridge 10. A base 84 comprises a plastic block containing bottom cavity sections of the three secondary reservoirs 8*a*, 8*b* and 8*c* (FIGS. 6 and 7). Three holes 86*a*, 86*b* and 86*c* extend laterally from the lowest points of the rounded bottoms of the reservoirs for connection to the appropriate orifices in the printing head 4. Positioned directly on top of the base 84 is a thin flexible diaphragm 88 (FIGS. 8 and 9) formed, for example, from one mil opaque polyethylene and having three domes 92*a*, 92*b* and 92*c*.

A cover 94 (FIGS. 10–12), positioned directly on top of the diaphragm 88, is formed from a rigid block of plastic and contains three dome sections 96*a*, 96*b* and 96*c* dimensioned to receive the diaphragm domes 92*a*, 92*b* and 92*c*. The cover 94 has three small vent holes 98*a*, 98*b* and 98*c* extending from the dome cavity to the top of the cover.

Figure 13:
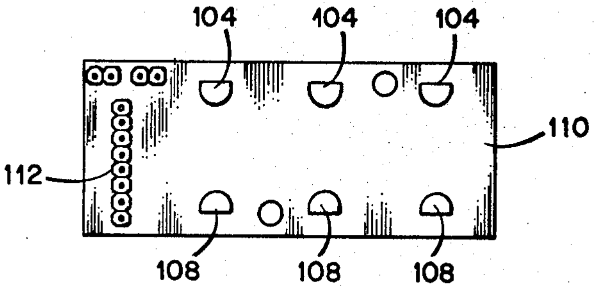
FIG. 13 is a bottom view of the printed circuit board mounting for the ink sensors.
Figure 14:
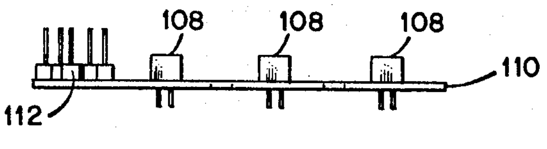
FIG. 14 is a side view of the board shown in FIG. 13.

On opposite sides of each cover dome cavity there is a vertical hole 102 that extends from the top of the cover part way through and opens into the dome in the area of its maximum diameter. These openings are provided to receive the optical illuminators 104 (FIGS. 13 and 14). A similar hole 106 on the opposite side of each dome 96 receives the corresponding sensor 108.

A printed circuit board 110 serves as a mounting for the three infrared illuminators 104 and the three sensors 108. The connector terminals 112 are appropriately connected to the sensors and illuminators by printed circuit leads (not shown) and are in turn connected to the appropriate control circuits.

Each of the illuminators 104 is positioned in one of the openings 102 and in line with one of the sensors 108 positioned in the opposite hole 106. As best illustrated by FIG. 5, when the reservoirs 8*a*, 8*b* and 8*c* are filled with ink, each of the diaphragm domes 92*a*, 92*b* and 92*c* is forced upwardly into the corresponding dome section 96*a*, 96*b* or 96*c*. Free movement of the diaphragms into and from the cover is assured by the three vent holes 98*a*, 98*b* and 96*c*. When the diaphragm 88, which is opaque, is forced upwardly into the cover 94, it interrupts the infrared beam between each illuminator and its corresponding sensor.

When the ink in any one of the secondary reservoirs drops to such a level that the beam from its illuminator 104 strikes the corresponding sensor 108, a signal to the central processor unit 28 actuates the appropriate valve 26*a*, 26*b* or 26*c* to fill the secondary reservoir. The solenoid valve remains open either until the infrared control beam is again interrupted or the timing circuit in the centrl processor 28 energizes the signal lamp 32 to indicate that the ink cartridge 18 should be replaced.

From the foregoing it will be apparent the multicolor ink system described herein is well adapted to meet the ends and objects herein set forth, that it is capable of economic manufacture in production quantities, and is subject to a variety of modifications within the scope of the following claims.

I claim:

1. In an ink jet printer having a printing head and a movable carriage carrying said printing head, an ink supply and disposal system comprising a disposable primary ink cartridge having an enclosed ink supply chamber and a closed waste-ink storage chamber separate from said ink supply chamber, a flexible ink reservoir enclosed in said chamber, a secondary ink container on said carriage having therein an ink-receiving reservoir, means including a flexible ink-supply conduit for transferring ink from said ink reservoir of said primary ink cartridge to said ink-receiving reservoir of said secondary ink container, collection means on said carriage for gathering waste ink from said head, flexible waste-ink duct means extending between said collection means and said storage chamber, a pump having an air inlet and an air outlet, a first conduit connected between said air outlet and said supply chamber operative to maintain said supply chamber under continuous gaseous pressure, a second conduit connected between said air inlet and said waste ink storage chamber thereby to maintain said storage chamber under reduced pressure, and ink-absorbing material positioned within said waste ink storage chamber.

* * * * *